United States Patent [19]

Althausen et al.

[11] 4,309,373

[45] Jan. 5, 1982

[54] PROCESS FOR FILLING CAVITIES WITH FLOWABLE REACTION MIXTURES

[75] Inventors: Ferdinand Althausen, Neunkirchen; Ferdinand Proksa, Leverkusen; Ulrich Osinski, Koenigswinter, all of Fed. Rep. of Germany

[73] Assignee: Maschinenfabrik Hennecke GmbH, Leverkusen, Fed. Rep. of Germany

[21] Appl. No.: 2,776

[22] Filed: Jan. 11, 1979

[30] Foreign Application Priority Data

Jan. 26, 1978 [DE] Fed. Rep. of Germany ....... 2803311

[51] Int. Cl.³ .............................................. B29F 1/03
[52] U.S. Cl. .................................... 264/51; 264/45.5; 264/240; 264/328.8; 264/328.12; 264/DIG. 83
[58] Field of Search ..................... 264/240, 328, 328.8, 264/328.12, 45.5, 51, DIG. 83

[56] References Cited

U.S. PATENT DOCUMENTS 2,430,033 11/1947 Stacy et al. .......................... 264/240
3,008,193 11/1961 Been .................................. 264/240
3,652,757 3/1972 Wessel et al. ..................... 264/328.8

*Primary Examiner*—James H. Derrington
*Attorney, Agent, or Firm*—Gene Harsh; Joseph C. Gil; Lyndanne M. Whalen

[57] ABSTRACT

The instant invention is directed to a process for filling a cavity with a flowable reaction mixture through an inlet opening located at the bottom of the cavity. The process broadly comprises injecting a relatively small amount of reaction mixture into the cavity to cover the inlet opening with reaction mixture. The injection process is then briefly interrupted. Thereafter, the remaining amount of reaction mixture is injected into the cavity. The invention also relates to apparatus useful in performing the above-described process.

1 Claim, 2 Drawing Figures

PROCESS FOR FILLING CAVITIES WITH FLOWABLE REACTION MIXTURES

BACKGROUND OF THE INVENTION

The invention relates to a process and equipment for filling cavities with a flowable reaction mixture, wherein the reaction mixture is injected through an inlet opening located at the bottom of the cavity. In this connection, the preferred reaction mixtures are those that form polyurethane and particularly those forming foam materials. The cavities to be filled can be those of hollow profiles (i.e., between structural sheets) or molds.

In the past, when the reaction mixture was injected into the cavity, the hydrodynamic inclusion of air could not generally be avoided. This was particularly true where some of the mixture had to be injected at a higher pressure because of the short reacting time of the reaction mixture. Since the hydrodynamically entrapped air was released only at the end of the injection cycle, it was virtually impossible for the air to escape through the top in the hardened mixture, particularly in the case of long, thin cavities.

It was therefore an object of the instant invention to provide a process and apparatus whereby the inclusion of air bubbles in the reacted mixture and, consequently, in the finished part could be avoided.

DESCRIPTION OF THE INVENTION

Figure 1:
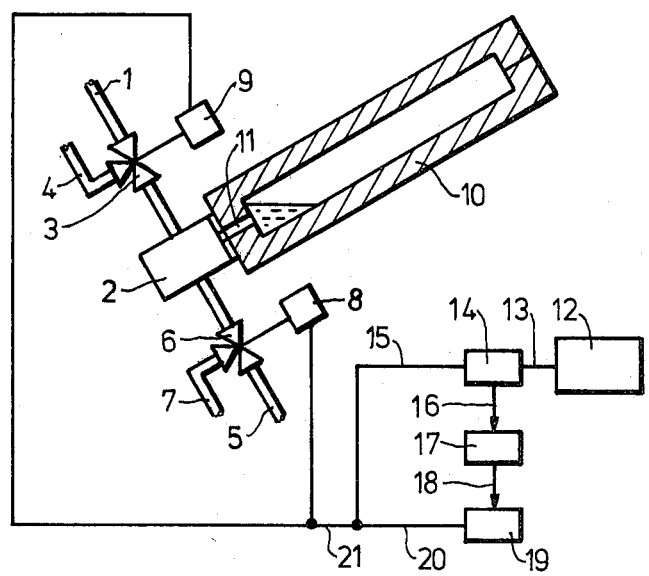
FIGS. 1 and 2 schematically illustrate two embodiments of apparatus useful in the instant invention.

The instant invention solves the above-identified problem by first injecting only enough reaction mixture to barely cover the mouth of the cavity inlet opening, then briefly interrupting the injection process, and subsequently injecting the remaining required reaction mixture.

"Inlet opening" as used herein is intended to mean the feed opening which leads either from the mixing chamber (in which the reaction mixture is produced) or from the mouth of a connection piece attached to the mixing chamber, or from the mouth of a restricted gate (as it is often present in molds) to the bottom of the cavity.

More particularly, the instant invention is directed to a process for filling a cavity with a flowable reaction mixture through an inlet opening located at the bottom of the cavity comprising:
(a) injecting a sufficient amount of flowable reaction mixture through the inlet opening to cover said inlet opening,
(b) stopping the flow of said flowable reaction mixture through said inlet opening, and
(c) injecting the remaining amount of said flowable reaction mixture into said cavity through said inlet opening.

The invention measure serves the purpose of stopping the flowing reaction mixture from bringing air into the cavity by briefly interrupting the injection cycle. Any entrapped air then has a chance to rise from the inlet opening area and to escape through the top of the mold. At a sufficiently high reaction mixture level in the cavity, the inlet opening should at least be covered. When the injection speed is high, the mixture level should be necessarily higher, so that in essentially the stream does not project through the surface level. The advantage of the process is that no air can be brought into the cavity when injecting the remaining mixture because the flowing mixture immediately loses its energy when passing the mixture that was previously injected.

The amount of the initial charge of reaction mixture to be injected and the length of time of the interruption depend on the cavity diameter, the viscosity of the flowable reaction mixture, the injection speed, and the reaction speed. Necessarily, the interruption should not be so long that the initial charge fully reacts.

Commercially available equipment can be used for the process. The equipment generally comprises a mixing head with regulator. The regulator comprises a timer for the first injection time interval, a timer for the interruption time interval and a timer for the second or final injection time interval. Time relays or digital timers, for example, are suitable time indicators.

In metering devices that operate with displacing pistons and recirculation (that is, the mold filling process is performed by one single stroke of a piston per component), the injected amount for a predetermined piston diameter depends on the length of the stroke. In this case also, the above-noted timers can also be used.

Devices according to the invention are preferably equipped with an end contact and a stop switch to allow interruption of the injection process and a second end contact as well as a second stop switch. The end contacts are preferably located on at least one of the metering pistons. End contacts or stop switches are preferably adjustable depending on the stroke length. As noted above, the preferred reaction mixtures are those forming polyurethanes and are generally produced from organic isocyanates and active hydrogen-containing materials (which are preferably polyhydroxyl materials).

The drawings schematically illustrate two embodiments of the invention.

FIG. 1 shows a flow mixing device.

Figure 2:
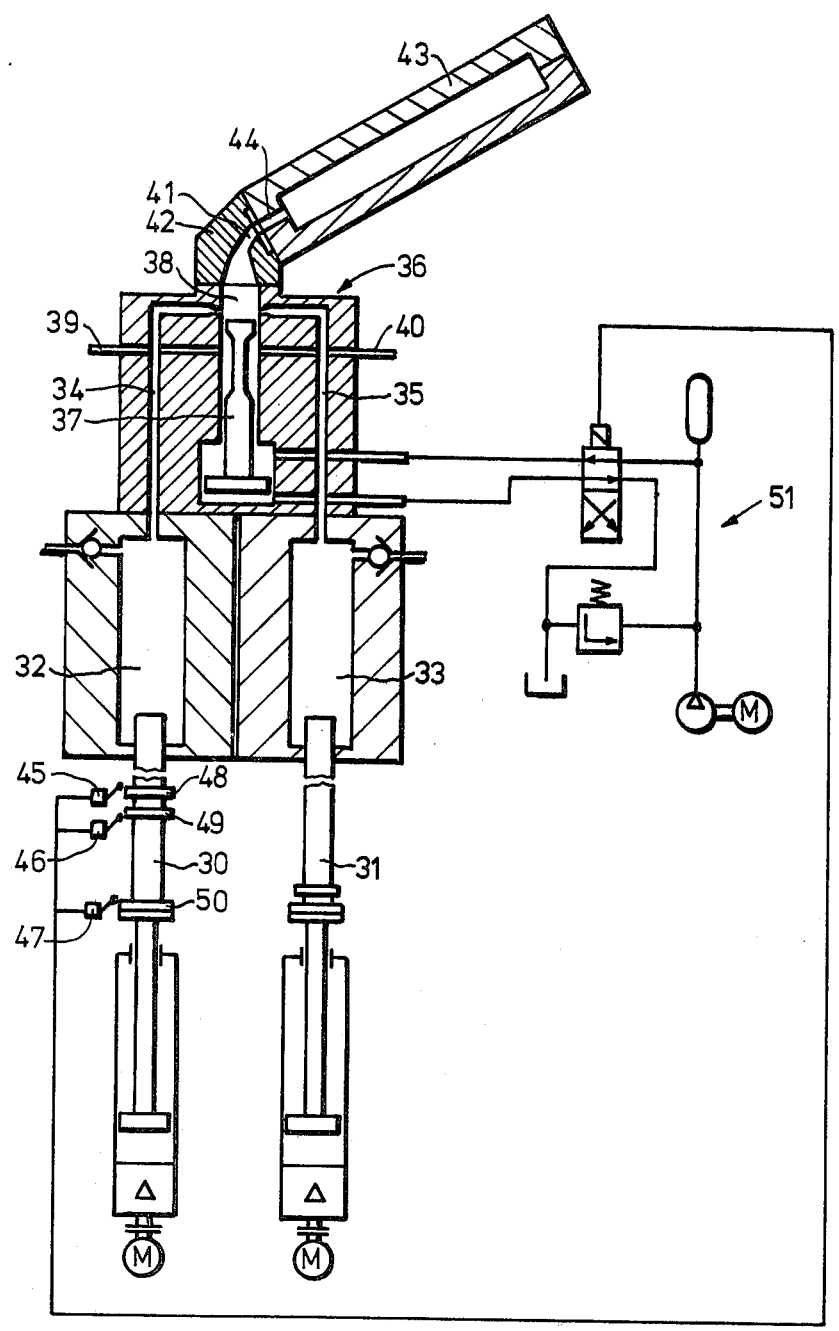

FIG. 2 shows a metering device with displacer.

In FIG. 1, a hose (1) for polyhydroxyl component leads to a mixing head (2) provided with a reversing valve (3) that leads to a return line (4). A hose (5) is provided for the isocyanate component to which hose a reversing valve (6) is attached, that leads to a return line (7). The reversing valves (3,6) are provided with servomotors (8,9). The mixing head (1) is attached to a mold (10) that is placed at an angle and has an inlet opening (11) on the bottom thereof. An impulse line (13) leads from the regulator (12) to a timer (14) for the first injection time interval. Impulse lines (15,16) lead from this timer. The impulse line (16) leads to a second timer (17) for an interruption time interval. This timer is connected by a further impulse line (18) with a third timer (19), that can be regulated for a second injection time interval. An impulse line (20) leads from timer (19) and combines with the impulse line (15) coming from the timer (14) to form impulse line (21). The latter connects with the two servomotors (8,9).

In FIG. 2, the metering piston device consists of two metering pistons (30, 31) for each of the components. The metering pistons (30, 31) are electrically coupled (not shown) and are hydraulically operated. Lines (34, 35) lead from the metering cylinders (32, 33) to a mixing head (36) where they open into a mixing chamber (38) that is provided with a displacing piston (37).

The return lines are marked with 39 and 40. The mixing chamber (38) connects with a gate (41), that is arranged in an intermediary connection piece (42) on which the mold (43) rests. The inlet opening is designated with 44. The metering piston (30) is provided with stop switches (45, 46, 47) that can be operated by the end contacts (48, 49, 50) that are located on the metering piston (30).

The stop switch (45) and the end contact (48) are adjusted in such a way, that, when they contact each other, the stroke length of the pistons (30, 31) until the moment of contact correspond to a volume which is equal to the volume of the reaction mixture to be fed into the mold cavity so that the desired level is reached. The switch (45) now activates the regulator (51) which is now switched to the recirculation position for the desired time interval so that the mold filling process is interrupted and the components are recirculated and the flow in the mold (43) is settled or calmed. As soon as the end contact (49) reaches the stop switch (46), the displacing piston (37) with the regulator (51) is again switched to mixing position. The injection process is continued until it is interrupted when the end contact (50) reaches the stop switch (47).

The invention is further illustrated, but is not intended to be limited by the following examples in which all parts and percentages are by weight unless otherwise specified.

EXAMPLES

EXAMPLE 1

5 meter long window profiles were manufactured in a mold from brown-colored rigid polyurethane integral-skin foam. A metering machine from Hennecke GmbH, 5205 St. Augustin 1, Germany, type HK 245, with attached mixing head was used, that had positively controlled recirculation nozzles. A mold in slanted position is used that has openings in the bottom. The injection velocity is 375 g/sec. The first partial amount is injected within 0.5 to 1 second corresponding to an injection amount of approximately 185 g to 375 g. The interruption time was varied between 0.5 and 1 second. The remaining amount of mixture was injected within 11.5 to 12 seconds. No air inclusions were visible.

Comparison Test

The same equipment was used as in Example 1; the same conditions were applied with the exception that the entire reaction mixture was injected continuously without any interruptions. Approximately 1.5 m from the gate a bubble was formed of approximately 1 $cm^3$ in volume.

EXAMPLE 2

6 m long hollow aluminum profiles were filled with rigid polyurethane integral-skin foam. A metering machine, type HK 165, by Maschinenfabrik Hennecke, GmbH, 5205 St. Augustin 1, Germany, was used, which was furnished with a stroke-push hand mixing head. The hollow profiles were in a slanted position and were filled from the sealed bottom front. The injection velocity was 500 g/sec.

The first amount of reaction mixture was injected within 5 seconds, that is 250 g. The interruption time was 1 second. The remaining amount was injected within the next 8 seconds. No bubbles were found.

Comparative Test

The same conditions and the same device was used as in Example 2 with the exception that the entire amount of reaction mixture was injected continuously. About 2 meter from the gate an approximately 30 cm long air bubble was found.

What is claimed is:

1. A process for filling a cavity with a flowable reaction mixture through an inlet opening located at the bottom of the cavity comprising:
    (a) injecting a sufficient amount of flowable reaction mixture through said inlet opening to cover said inlet opening,
    (b) stopping the flow of said flowable reaction mixture through said inlet opening, thereby allowing air to escape through the top of the cavity, and
    (c) injecting the remaining amount of said flowable reaction mixture into said cavity through said inlet opening at a speed such that the stream does not disrupt the surface level of the reaction mixture in the cavity.

* * * * *